United States Patent
Li et al.

(10) Patent No.: US 11,967,874 B2
(45) Date of Patent: Apr. 23, 2024

(54) LINEAR VIBRATION MOTOR WITH COPPER RIG AROUND MAGNETIC CONDUCTIVE PLATE WITH THICKNESS

(71) Applicant: AAC Microtech (Changzhou) Co., Ltd., Changzhou (CN)

(72) Inventors: Ziang Li, Shenzhen (CN); Zhiyong Cui, Shenzhen (CN); Jie Ma, Shenzhen (CN); Lubin Mao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 350 days.

(21) Appl. No.: 17/541,287

(22) Filed: Dec. 3, 2021

(65) Prior Publication Data
US 2022/0320984 A1    Oct. 6, 2022

(30) Foreign Application Priority Data
Mar. 31, 2021    (CN) .......................... 202120662956.3

(51) Int. Cl.
*H02K 33/02*    (2006.01)
(52) U.S. Cl.
CPC .................................... *H02K 33/02* (2013.01)
(58) Field of Classification Search
CPC .... H02K 7/1876; H02K 7/1892; H02K 33/00; H02K 33/02; H02K 33/04; H02K 33/06; H02K 33/08; H02K 33/10; H02K 33/16; H02K 33/18; H02N 1/00; H02N 1/002; H02N 1/04
USPC .. 310/12, 12.12, 12.01, 12.03, 12.13, 12.16, 310/12.26, 15–29
See application file for complete search history.

(56) References Cited

U.S. PATENT DOCUMENTS

| | | | | |
|---|---|---|---|---|
| 7,859,144 B1 * | 12/2010 | Sahyoun | ................ | H02K 33/16 335/229 |
| 8,648,502 B2 * | 2/2014 | Park | ....................... | H02K 33/16 310/15 |
| 9,024,489 B2 * | 5/2015 | Akanuma | .............. | H02K 33/16 310/15 |
| 9,306,429 B2 * | 4/2016 | Akanuma | .............. | H02K 33/16 |
| 9,543,816 B2 * | 1/2017 | Nakamura | ............. | H02K 33/16 |
| 9,748,827 B2 * | 8/2017 | Dong | ..................... | H02K 33/16 |
| 9,815,085 B2 * | 11/2017 | Chun | ...................... | G06F 3/016 |
| 9,912,217 B2 * | 3/2018 | Xu | ........................ | H02K 33/16 |

(Continued)

FOREIGN PATENT DOCUMENTS

CN    205490073 U  *  1/2016

OTHER PUBLICATIONS

CN205490073U English Translation.*

*Primary Examiner* — Maged M Almawri
(74) *Attorney, Agent, or Firm* — W&G Law Group

(57) ABSTRACT

The present disclosure discloses a linear motor including a housing with an accommodation space, a vibrator and a stator received in the accommodation space and an elastic support fixed on the vibrator and configured to suspend the vibrator in the accommodation space; the stator includes a coil and a copper ring both opposite to the vibrator; the copper ring and the coil are arranged on two opposite sides of the vibrator separately along a first direction perpendicular with a vibration direction of the vibrator. The copper ring serves as a damper providing electromagnetic resilience for the vibrator, effectively improve the automation and efficiency of the manufacture of the linear vibration motor.

7 Claims, 4 Drawing Sheets

(56) References Cited

U.S. PATENT DOCUMENTS

| | | | | |
|---|---|---|---|---|
| 9,948,170 B2* | 4/2018 | Jun | ............... | H02K 33/00 |
| 10,063,128 B2* | 8/2018 | Wang | ............... | H02K 33/16 |
| 10,160,010 B2* | 12/2018 | Chun | ............... | H02K 33/16 |
| 10,270,304 B2* | 4/2019 | Wang | ............... | H02K 33/16 |
| 10,328,461 B2* | 6/2019 | Xu | ............... | B06B 1/045 |
| 10,447,129 B2* | 10/2019 | Mao | ............... | H02K 33/00 |
| 10,486,196 B2* | 11/2019 | Chai | ............... | B06B 1/045 |
| 10,491,090 B2* | 11/2019 | Zu | ............... | H02K 33/16 |
| 10,596,595 B2* | 3/2020 | Hua | ............... | B06B 1/045 |
| 10,763,732 B2* | 9/2020 | Liu | ............... | H02K 33/18 |
| 10,886,827 B2* | 1/2021 | Liu | ............... | H02K 33/14 |
| 11,025,148 B2* | 6/2021 | Tang | ............... | H02K 33/12 |
| 11,081,950 B2* | 8/2021 | Zhang | ............... | H02K 33/18 |
| 11,211,859 B2* | 12/2021 | Tang | ............... | H02K 33/18 |
| 11,271,465 B2* | 3/2022 | Kitahara | ............... | H02K 33/16 |
| 11,515,774 B2* | 11/2022 | Yan | ............... | H02K 33/16 |
| 11,626,786 B2* | 4/2023 | Maeda | ............... | H02K 33/02 310/29 |
| 11,641,152 B2* | 5/2023 | Cui | ............... | H02K 35/02 310/28 |
| 2006/0131965 A1* | 6/2006 | Friedland | ............... | H02K 26/00 310/12.22 |
| 2011/0018364 A1* | 1/2011 | Kim | ............... | H02K 33/18 310/20 |
| 2011/0062803 A1* | 3/2011 | Lee | ............... | H02K 33/18 310/29 |
| 2011/0068640 A1* | 3/2011 | Choi | ............... | H02K 5/04 310/25 |
| 2011/0115311 A1* | 5/2011 | Dong | ............... | H02K 33/16 310/28 |
| 2011/0133577 A1* | 6/2011 | Lee | ............... | H02K 33/18 310/15 |
| 2012/0025633 A1* | 2/2012 | Lee | ............... | G02B 7/04 310/12.16 |
| 2013/0099600 A1* | 4/2013 | Park | ............... | B06B 1/045 310/15 |
| 2015/0123498 A1* | 5/2015 | Yang | ............... | H02K 33/16 310/25 |
| 2016/0218607 A1* | 7/2016 | Oh | ............... | H02K 33/16 |
| 2016/0226363 A1* | 8/2016 | Mao | ............... | H02K 33/16 |
| 2016/0336842 A1* | 11/2016 | Chun | ............... | H02K 33/16 |
| 2017/0033653 A1* | 2/2017 | Wang | ............... | H02K 33/16 |
| 2017/0033657 A1* | 2/2017 | Mao | ............... | H02K 33/16 |
| 2017/0033672 A1* | 2/2017 | Xu | ............... | H02K 33/16 |
| 2017/0104401 A1* | 4/2017 | Umehara | ............... | H02K 33/06 |
| 2017/0117788 A1* | 4/2017 | Hou | ............... | H02K 1/34 |
| 2017/0179804 A1* | 6/2017 | Xu | ............... | H02K 33/00 |
| 2017/0288524 A1* | 10/2017 | Jin | ............... | H02K 5/225 |
| 2017/0341108 A1* | 11/2017 | Mao | ............... | H02K 33/00 |
| 2017/0373578 A1* | 12/2017 | Wu | ............... | H02K 33/16 |
| 2018/0021812 A1* | 1/2018 | Akanuma | ............... | H02K 33/00 310/25 |
| 2018/0241292 A1* | 8/2018 | Zu | ............... | H02K 33/16 |
| 2018/0248457 A1* | 8/2018 | Shi | ............... | F16F 15/08 |
| 2018/0297061 A1* | 10/2018 | Mao | ............... | H02K 5/04 |
| 2018/0297062 A1* | 10/2018 | Huang | ............... | H02K 11/33 |
| 2018/0297071 A1* | 10/2018 | Xu | ............... | B06B 1/045 |
| 2018/0342937 A1* | 11/2018 | Mao | ............... | H02K 33/02 |
| 2019/0157958 A1* | 5/2019 | Mao | ............... | H02K 33/12 |
| 2019/0207496 A1* | 7/2019 | Takahashi | ............... | H02K 33/02 |
| 2019/0305637 A1* | 10/2019 | Suzuki | ............... | B06B 1/045 |
| 2020/0044533 A1* | 2/2020 | Tang | ............... | H02K 33/12 |
| 2020/0044539 A1* | 2/2020 | Tang | ............... | H02K 33/14 |
| 2020/0044540 A1* | 2/2020 | Tang | ............... | H02K 33/16 |
| 2020/0044546 A1* | 2/2020 | Zhang | ............... | H02K 33/16 |
| 2020/0044548 A1* | 2/2020 | Tang | ............... | H02K 33/18 |
| 2020/0195115 A1* | 6/2020 | Zhang | ............... | H02K 33/16 |
| 2020/0195116 A1* | 6/2020 | Zhang | ............... | H02K 33/18 |
| 2020/0212774 A1* | 7/2020 | Ling | ............... | H02K 1/34 |
| 2020/0212776 A1* | 7/2020 | Ling | ............... | H02K 33/16 |
| 2020/0212778 A1* | 7/2020 | Tao | ............... | H02K 33/18 |
| 2023/0238866 A1* | 7/2023 | Li | ............... | H02K 33/04 310/28 |

* cited by examiner

LINEAR VIBRATION MOTOR WITH COPPER RIG AROUND MAGNETIC CONDUCTIVE PLATE WITH THICKNESS

FIELD OF THE PRESENT DISCLOSURE

The present disclosure relates to tactile feedback technologies, especially relates to a linear vibration motor applied in mobile device.

DESCRIPTION OF RELATED ART

With the development of electronic technologies, portable consumable electronic products are increasingly popular, such as mobile phone, hand-held game console, navigating device or hand-held multimedia entertainment equipment, in which a linear vibration motor is generally used for system feedback, such as call reminder, message reminder, navigation reminder of mobile phone, vibration feedback of game console.

A linear vibration motor of related art includes a foam as a damper. The foam assembling during the manufacture of the linear vibration motor, however, is a non-automation process, which is inefficient. Furthermore, the resistance provided by the foam is not enough for the linear vibration motor with high actuating force.

Therefore, it is necessary to provide an improved linear vibration motor to overcome the problems mentioned above.

SUMMARY OF THE INVENTION

The present disclosure provides a linear vibration motor with higher vibration balance ability.

The linear vibration motor includes a housing with an accommodation space, a vibrator received in the accommodation space, a stator received in the accommodation space and fixed on the housing, and an elastic support fixed on the vibrator and configured to suspend the vibrator in the accommodation space. The vibrator includes a weight with a receiving space, and a magnet unit fixed on the weight and received in the receiving space. The stator includes a coil opposite to the magnet unit and arranged on one side of the vibrator along a first direction perpendicular with a vibration direction of vibrator, and a copper opposite to the magnet unit and arranged on the other side of the vibrator along the first direction.

a housing with an accommodation space, a vibrator received in the accommodation space, a stator received in the accommodation space and fixed on the housing and an elastic support fixed on the vibrator and configured to suspend the vibrator in the accommodation space; the vibrator includes a weight with a receiving space and a magnet unit fixed on the weight and disposed in the receiving space; the stator includes a coil and a copper ring both opposite to the magnet unit; the copper ring and the coil are arranged on two opposite sides of the vibrator separately along a first direction perpendicular with a vibration direction of the magnet unit.

Further, the stator includes an iron core surrounded by the coil; a thickness of the iron core along the first direction is no more than a thickness of the coil along the first direction.

Further, the stator includes a magnetic conductive plate surrounded by the copper ring; a thickness of the magnetic conductive plate along the first direction is no more than a thickness of the copper ring along the first direction.

Further, a projection of the iron core along the first direction overlaps a projection of the magnetic conductive plate along the first direction.

Further, the stator includes a flexible printed circuit board fixed on the housing; the iron core is positioned on the flexible printed circuit board.

Further, the weight includes a first surface facing the copper ring and a second surface facing the coil; a first groove is formed by denting the first surface away from the copper ring along the first direction; a second groove is formed by denting the second surface away from the coil along the first direction.

Further, the receiving space penetrates through the weight along the first direction and connects the first groove with the second groove.

Further, the linear vibration motor includes two elastic support arranged on two opposite sides of the weight along the vibration direction; two ends of the elastic support is fixed on the weight and the housing separately.

Further, the housing includes a top wall, a bottom wall opposite to the top wall and a side wall connecting the top wall with the bottom wall; the accommodation space is enclosed by the top wall, the bottom wall and the side wall; the copper ring is fixed on the top wall; the coil is fixed on the bottom wall; one end of the elastic support is fixed on the side wall.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
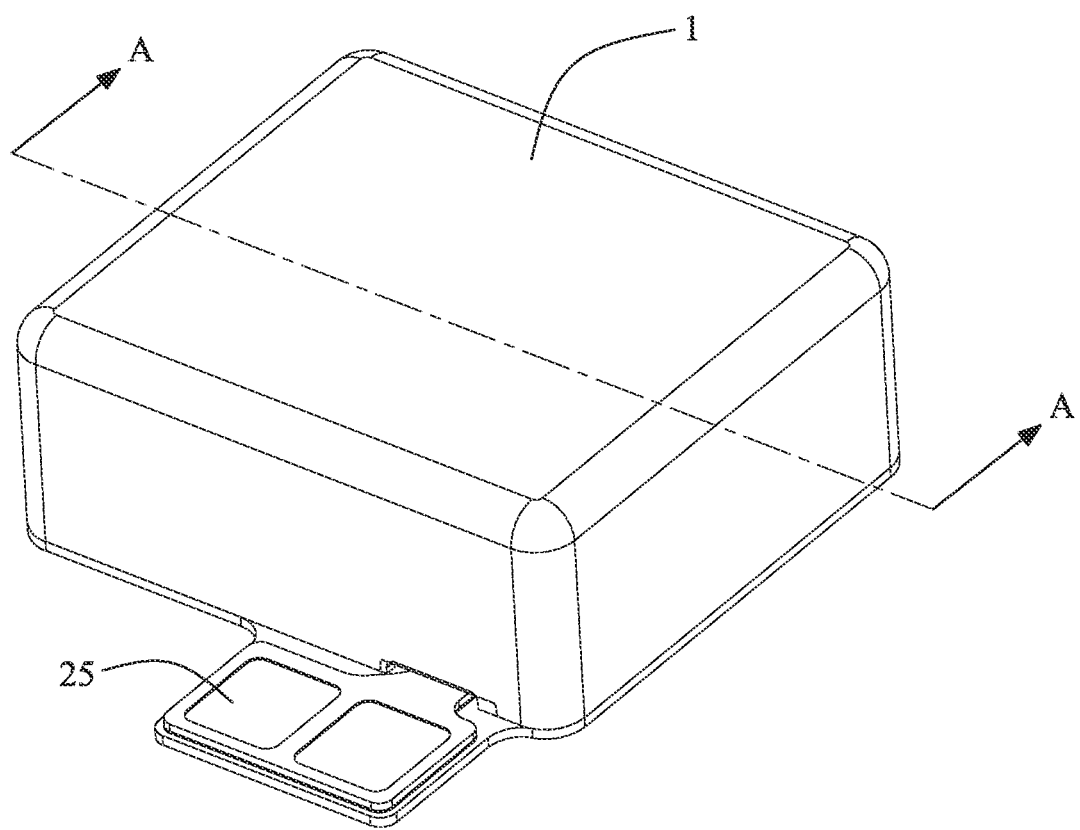
FIG. 1 is an isometric view of a linear vibration motor in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

It should be noted that the description of "first", "second" and the like in the present disclosure is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the various embodiments can be combined with each other, but it must be based on that it can be realized by ordinary technicians. When the combination of the technical solutions is contradictory or cannot be realized, it should be considered that the combination of the technical solutions does not exist, nor is it within the scope of protection required by the present disclosure.

Please refer to FIGS. 1-4 together, a linear vibration motor 100 provided by an exemplary embodiment of the present disclosure includes a housing 1 with an accommodation space 11, a stator 2, a vibrator 3 and an elastic support 4. The stator 2, the vibrator 3 and the elastic support 4 are all received in the accommodation space 11. The elastic support 4 is fixed on the vibrator 3 and configured to suspend the vibrator 3 in the accommodation space 11.

Specifically, the housing 1 includes a top wall 12, a bottom wall 14 opposite to the top wall 12 and a side wall 13 connecting the top wall 12 and the bottom wall 14. The top wall 12, the bottom wall 14 and the side wall 13 enclose the accommodation space 11 together.

Figure 2:
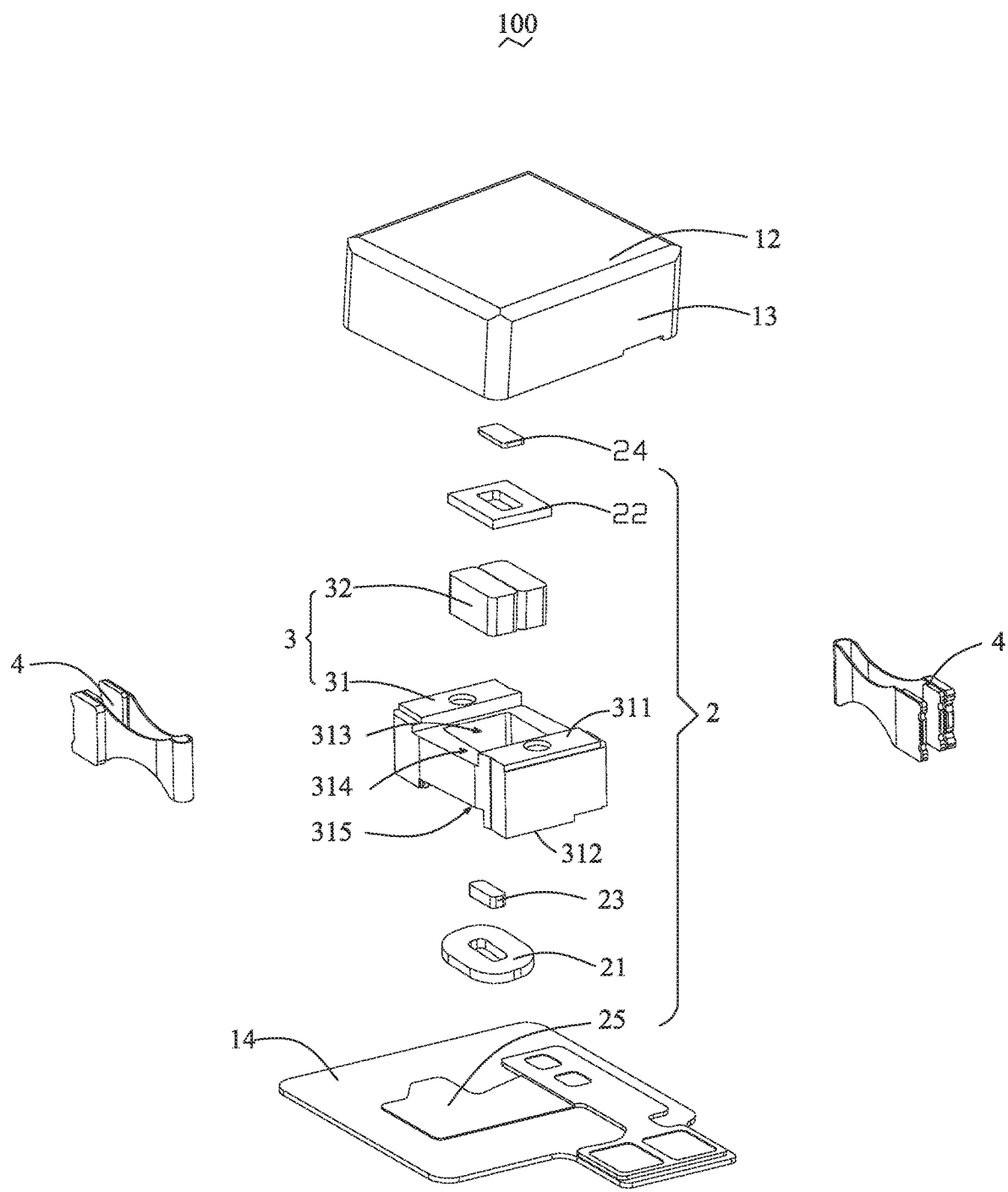
FIG. 2 is an exploded view of the linear vibration motor in FIG. 1.
Figure 3:
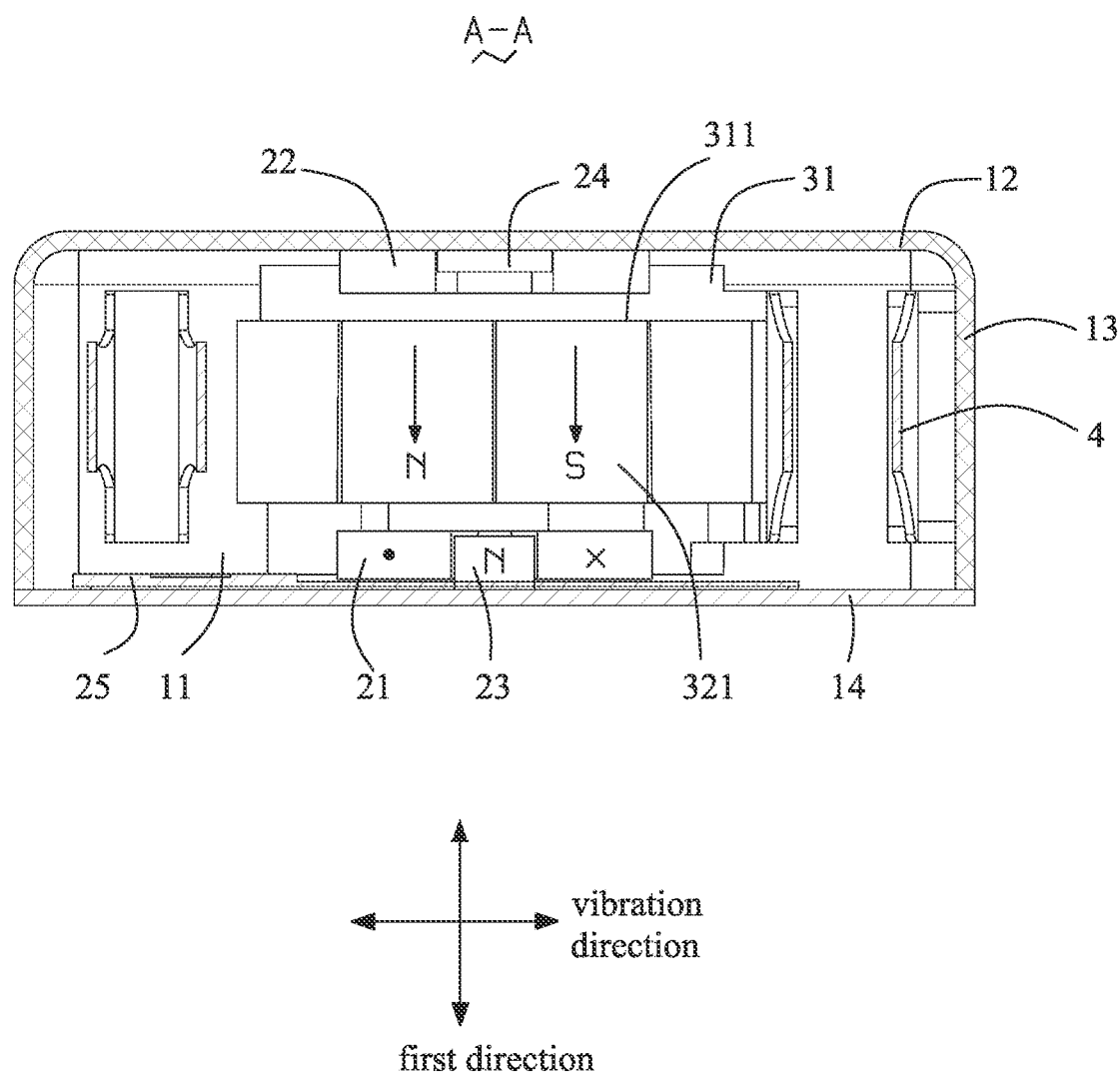
FIG. 3 is a cross-sectional view of the linear vibration motor taken along line A-A in FIG. 1.

Please refer to FIG. 2-FIG. 3, the vibrator 3 includes a weight 31 with a receiving space 313 and a magnet unit 32 fixed on the weight 31 and received in the receiving space 313. The linear vibration motor 100 includes two elastic supports 4 arranged on two opposite sides of the weight 31 along a vibration direction of the vibrator 3. Two ends of the elastic support 4 are fixed on the weight 31 and the side wall 13 separately.

Figure 4:
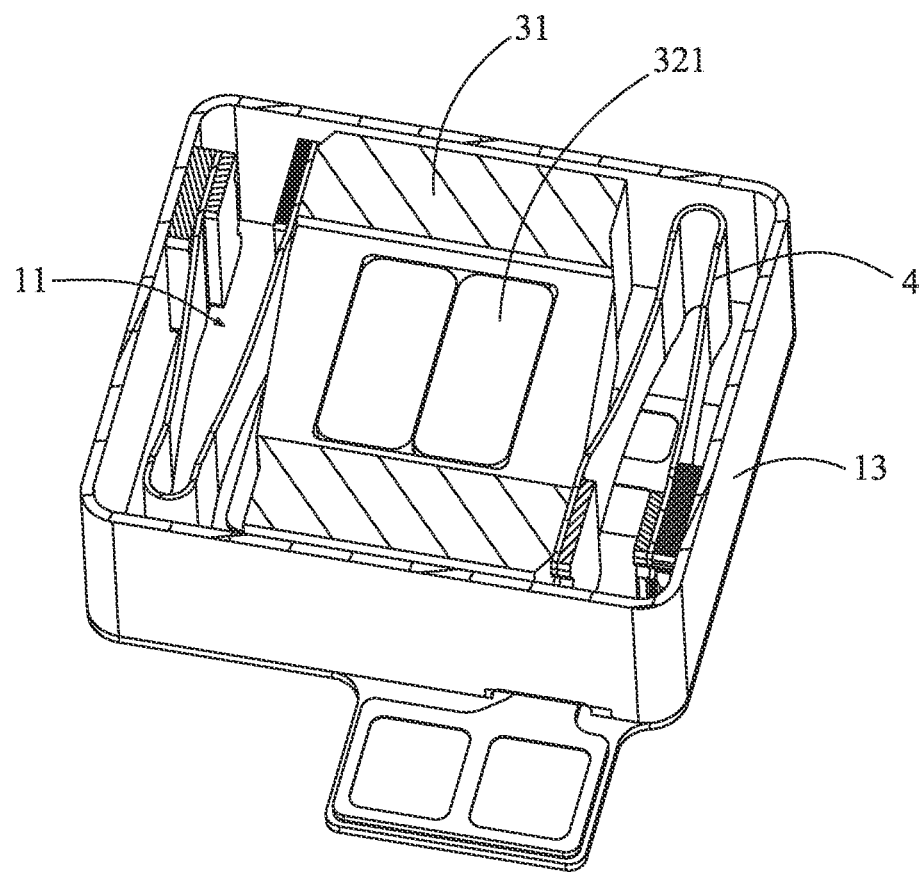
FIG. 4 is a cross-sectional view of the linear vibration motor without a top wall.

Please refer to FIG. 2-FIG. 4, the stator 2 includes a coil 21 and a copper ring 22 both opposite to the magnet unit 32. The coil 21 and the copper ring 22 are both fixed on the housing 1 and facing the magnet unit 32. The coil 21 and the copper ring 22 are arranged on two opposite sides of the vibrator 3 separately along a first direction perpendicular with the vibration direction of the vibrator 3. Furthermore, the copper ring 22 is fixed on the top wall 12, and the coil 21 is fixed on the bottom wall 14. When the coil 21 is power on, the vibrator 3 with the magnet unit 32 is actuated to reciprocate along the vibration direction. It can be understood that the copper ring 22 serves as a damper to provide resilience for the vibrator 3. Specifically, when the vibrator 3 vibrates, the copper ring 22 is located in the magnetic field of the magnet unit 32, thus generating vortex. With the cooperative effect of the vortex and the magnet field of the magnet unit 32, the resilience is effectively improved. It is a type of electromagnetic resistance. It can be understood that the resilience is along a direction opposite with the vibration direction. Compared with the related art, assembling the copper ring 22 during the manufacture of the linear vibration motor 100 is an automation process, which is more efficient than that of the traditional foam damper.

In this embodiment, the stator 2 includes an iron core 23 surrounded by the coil 21; the iron core 23 is positioned on the bottom wall 13. When the coil 21 is power on, an ampere force is generated to actuate the vibrator 3. In the same time, the iron core 23 is polarized, an electromagnetic force is generated to actuate the vibrator 3, thus increasing the actuation force of the linear vibration motor 100. Furthermore, a thickness of the iron core 23 along the first direction is no more than a thickness of the coil 21 along the first direction.

In this embodiment, the stator 2 further includes a magnetic conductive plate 24 surrounded by the copper ring 22; the magnetic conductive plate 24 is positioned on the top wall 12. A force along the first direction is generated between the iron core 23 and the magnet unit 32, thus resulting in unbalanced vibration. In this manner, the magnetic conductive plate 24 can eliminate the said force by generating a reverse force with the magnet unit 32, thus balancing the vibration of the vibrator 3. Additionally, a thickness of the magnetic conductive plate 24 along the first direction is no more than a thickness of the copper ring 22 along the first direction. A projection of the iron core 23 along the first direction overlaps a projection of the magnetic conductive plate 24 along the first direction. It can be understood that the coil 21 and the copper ring 22 are both hollow structure so that there is central space for receiving the iron core 23 and the magnetic conductive plate 24 respectively.

Please refer to FIG. 2-FIG. 3, the stator 2 further includes a flexible printed circuit board 25 fixed on the bottom wall 14; the iron core 23 is positioned on the flexible printed circuit board 25.

In this embodiment, the weight 31 includes a first surface 311 facing the copper ring 22 and a second surface 312 facing the coil 21; a first groove 314 is formed by denting the first surface 311 away from the copper ring 22 along the first direction; a second groove 315 is formed by denting the second surface 312 away from the coil 21 along the first direction. In detail, as shown in FIG. 2-FIG. 3, the receiving space 313 penetrates the weight 31 along the first direction and connects the first groove 314 with the second groove 315. When the vibrator 3 vibrates along the vibration direction, the first groove 314 provides space for the copper ring 22 so that the weight 31 does not collide with the copper ring during vibration. Similarly, the weight 31 does not collide with the coil 21 because of the second groove 315. Moreover, the height of the linear vibration motor 100 along the first direction can be decreased.

In this embodiment, the magnet unit 32 includes two magnet 321 successively arranged along the vibration direction. The magnetization direction of the magnets 321 is along the first direction. The two magnets 321 is magnetized in opposite direction.

Compared with the related art, in the embodiment of the present disclosure, the linear vibration motor includes a copper ring as a type of electromagnetic damper. Assembling the copper ring during the manufacture of the linear vibration motor is an automation process, which is more efficient. Furthermore, the electromagnetic force between the iron core and the magnet provides higher actuation force besides the ampere force generated between the coil and the magnet, thus optimizing vibration ability. Moreover, the magnetic conductive plate effectively decreases the non-vibration direction force and improves the vibration balance ability.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
a housing with an accommodation space;
a vibrator received in the accommodation space, comprising a weight with a receiving space, and a magnet unit fixed on the weight and received in the receiving space;
a stator received in the accommodation space and fixed on the housing, comprising:

a coil opposite to the magnet unit and arranged on one side of the vibrator along a first direction perpendicular with a vibration direction of vibrator; and a copper ring opposite to the magnet unit and arranged on the other side of the vibrator along the first direction; and an elastic support fixed on the vibrator and configured to suspend the vibrator in the accommodation space;

the stator further comprises an iron core surrounded by the coil and a magnetic conductive plate surrounded by the copper ring; a thickness of the iron core along the first direction is no more than a thickness of the coil along the first direction; a thickness of the magnetic conductive plate along the first direction is no more than a thickness of the copper ring along the first direction.

2. The linear vibration motor as described in claim 1, wherein a projection of the iron core along the first direction overlaps a projection of the magnetic conductive plate along the first direction.

3. The linear vibration motor as described in claim 1, further comprising two elastic support arranged on two opposite sides of the weight along the vibration direction; wherein two ends of the elastic support is fixed on the weight and the housing separately.

4. The linear vibration motor as described in claim 1, wherein the housing comprises a top wall, a bottom wall opposite to the top wall and a side wall connecting the top wall with the bottom wall; the accommodation space is enclosed by the top wall, the bottom wall and the side wall; the copper ring is fixed on the top wall; the coil is fixed on the bottom wall; one end of the elastic support is fixed on the side wall.

5. The linear vibration motor as described in claim 1, wherein the stator further comprises a flexible printed circuit board fixed on the housing; the iron core is positioned on the flexible printed circuit board.

6. The linear vibration motor as described in claim 5, wherein the weight comprises a first surface facing the copper ring and a second surface facing the coil; a first groove is formed by denting the first surface away from the copper ring along the first direction; a second groove is formed by denting the second surface away from the coil along the first direction.

7. The linear vibration motor as described in claim 6, wherein the receiving space penetrates through the weight along the first direction and connects the first groove with the second groove.

* * * * *